United States Patent [19]
Schmidt

[11] 3,726,301
[45] Apr. 10, 1973

[54] PILOT VALVE

[75] Inventor: Alvin J. Schmidt, Elkins Park, Pa.

[73] Assignee: J. E. Lonergan Company, Philadelphia, Pa.

[22] Filed: Dec. 21, 1970

[21] Appl. No.: 100,193

[52] U.S. Cl. .................137/102, 137/115, 137/469, 137/492

[51] Int. Cl................................................F16k 17/10

[58] Field of Search..................137/102, 116.3, 469, 137/488, 492, 492.5, 539.5, DIG. 2

[56] References Cited

UNITED STATES PATENTS

| | | | |
|---|---|---|---|
| 3,568,706 | 3/1971 | Weise | 137/492 X |
| 3,304,951 | 2/1967 | Farris | 137/492 |
| 3,512,560 | 4/1970 | Weise | 137/102 |
| 3,512,549 | 5/1970 | Weigand | 137/489 |
| 2,831,500 | 4/1958 | Fennema et al. | 137/539.5 X |
| 3,211,174 | 10/1965 | Weise et al. | 137/469 |
| 3,294,111 | 12/1966 | Abercrombie et al. | 137/492 |
| 3,414,008 | 12/1968 | Greenwood | 137/492 |

Primary Examiner—William F. O'Dea
Assistant Examiner—Peter D. Ferguson
Attorney—Howson & Howson

[57] ABSTRACT

A pilot valve in which the control port is connected alternatively to a pressure port and a vent port, including two valve seats and interconnected valve elements cooperating with the seats. The structure of the valve seats forms a pressure-building chamber upon initial movement of the valve elements in which the pressure fluid is trapped to generate a pressure on the interconnected valve elements tending to displace said elements abruptly toward their limit positions. This abrupt action is provided at one seat by a ported rod interconnecting the valve elements and providing a restriction in the flow passage between the pressure port and the pressure chamber which enables build-up of pressure in the chamber upon initial movement of the valve elements toward the position disconnecting the vent port and connecting the pressure port.

11 Claims, 6 Drawing Figures

PATENTED APR 10 1973
3,726,301
SHEET 1 OF 2
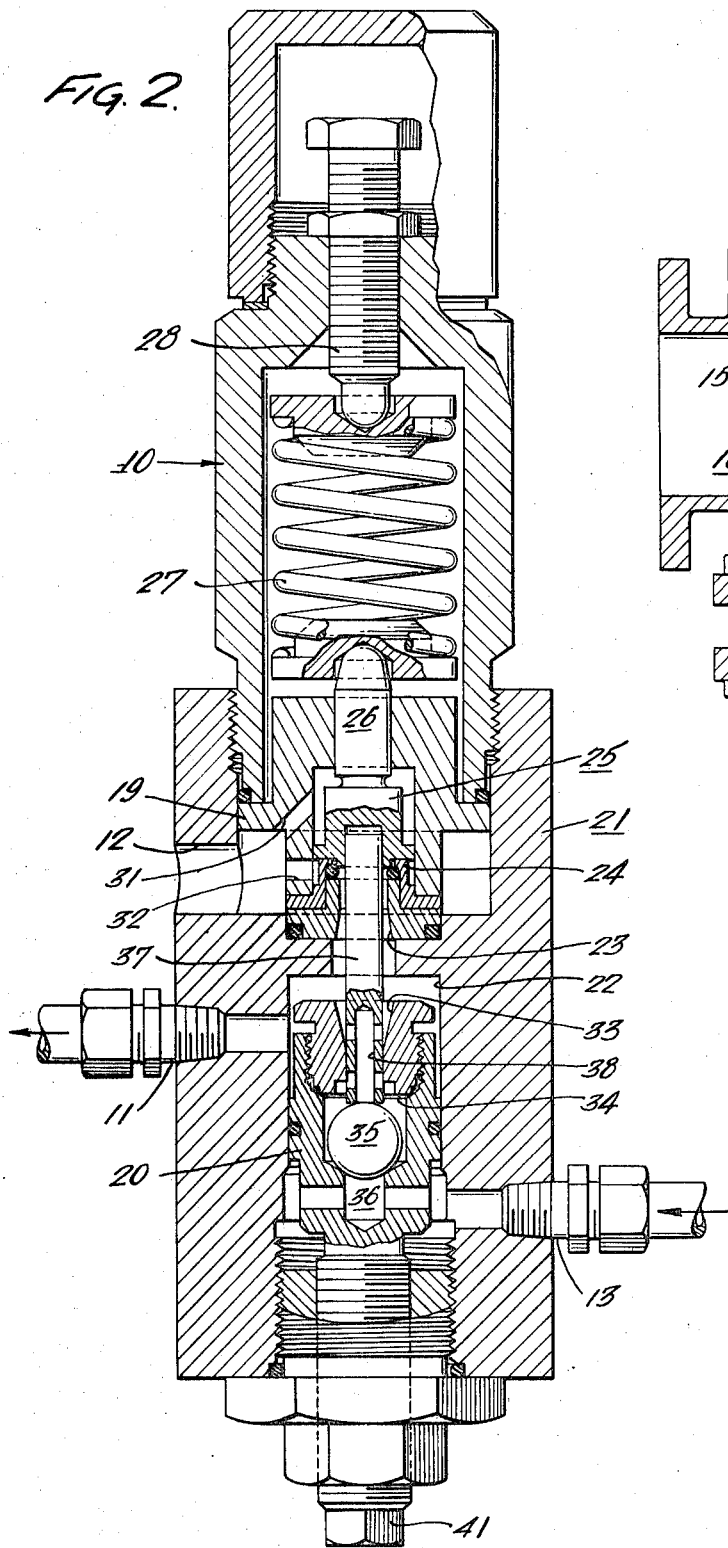
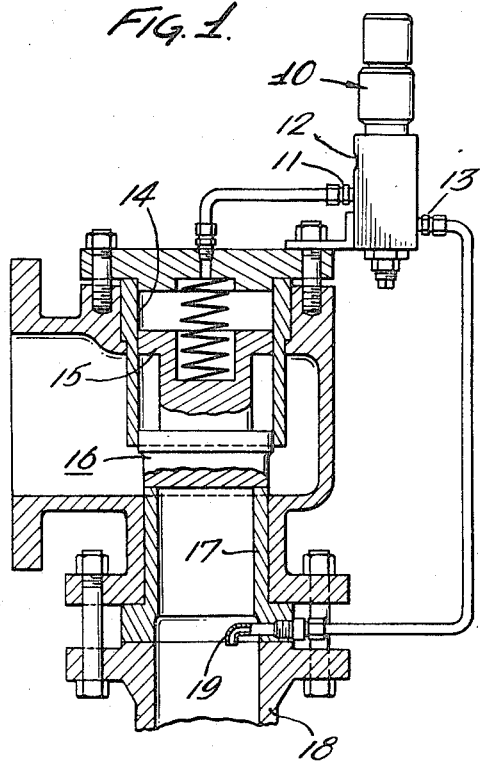
INVENTOR:
ALVIN J. SCHMIDT
BY
Howson & Howson
ATTYS.

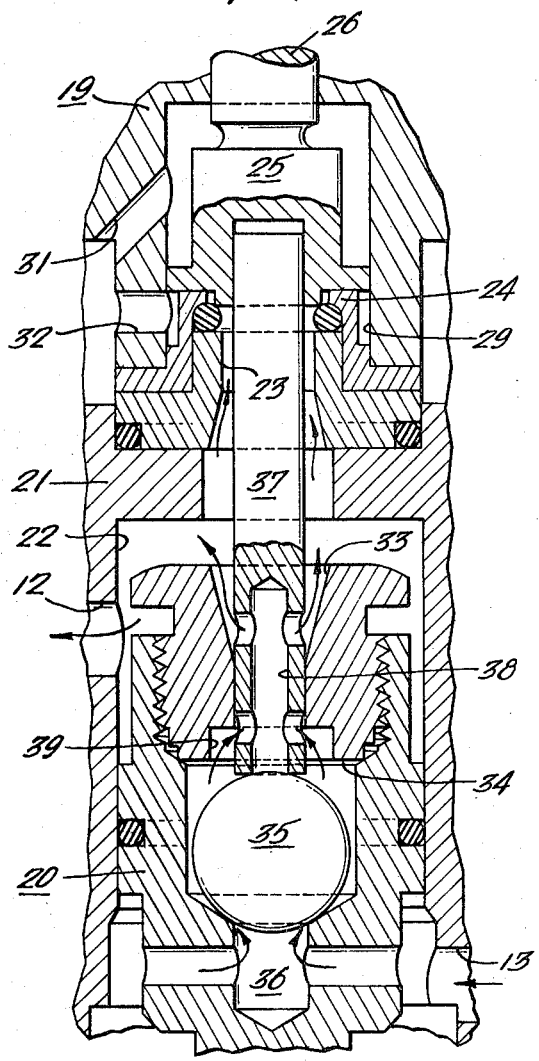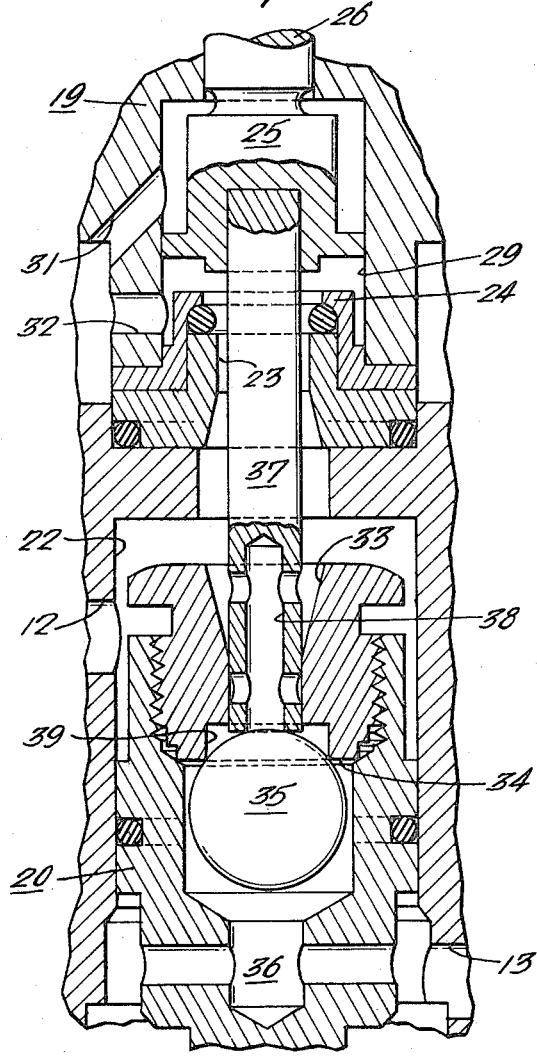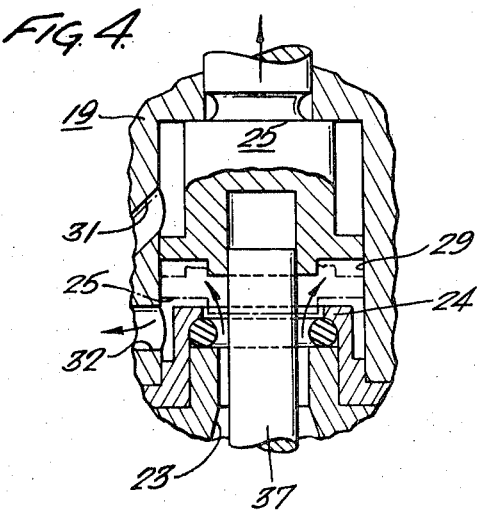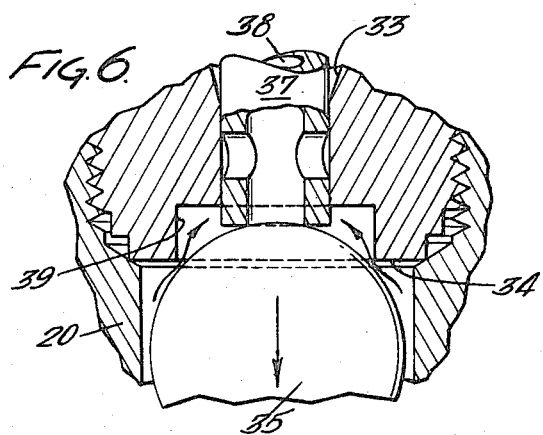

PILOT VALVE

The present invention relates to pilot valves and has particular application to a pilot valve having a control port which is alternatively connected to a pressure port and a vent port.

Pilot valves are employed for operating the main relief valve of a pressure vessel. In such an installation, the control port of the pilot valve operates to direct pressure fluid from the vessel against the main valve in such a manner that the pressure fluid in the vessel serves to maintain the main valve closed so long as the control port of the pilot valve is connected to the vessel pressure. When the vessel pressure reaches "blow-off", the pilot valve is actuated to close communication between the main valve and the vessel pressure and to vent the main valve to atmosphere or other lower pressure area. This opens the main valve and permits relief of fluid pressure from the vessel in an amount to return the vessel pressure to a safe level. The pilot valve, when this safe level, or "blow-down" pressure, is reached, interrupts the venting of the main valve and reconnects the valve to the vessel pressure so that the main valve is closed. It is desirable to effect a rapid closure of the main valve once the blow-down pressure is attained, so as to avoid unnecessary loss of fluid from the vessel.

With the foregoing in mind, the present invention provides an improved pilot valve structure which makes it possible to closely and precisely control the blow-down pressure of the pilot valve and to insure proper actuation of the valve.

More specifically, the present invention provides a structure which forms pressure-building chambers which operate on the valve elements of the pilot valve to insure rapid and positive displacement of the valve elements between open and closed position.

The structure of the present invention provides a pressure-building chamber adjacent each valve seat which operates on the associated valve element to accelerate displacement of the valve element immediately upon initial cracking-open of the valve passageway.

This present invention provides a valve which performs these functions in a simple and effective manner and which is highly economical to manufacture and maintain.

All of the objects of the present invention are more fully set forth hereinafter with reference to the accompanying drawing wherein:

FIG. 1 is a view in section through a main valve having a pilot valve made in accordance with the present invention associated therewith.

FIG. 2 is a sectional view through the pilot valve shown in FIG. 1 in normal position wherein the control port is in direct communication with the pressure vessel.

FIG. 3 is an enlarged fragmentary sectional view of the pilot valve illustrating the valve seats and the fluid communication provided in the normal position of the valve.

FIG. 4 is a fragmentary sectional view illustrating the upper valve seat with the valve element in the fully open position occurring after blow-off.

FIG. 5 is a view similar to FIG. 3 illustrating the position of the elements immediately prior to blow-down; and FIG. 6 is a fragmentary sectional view of the lower valve seat illustrating the fluid communication immediately after attainment of blow-down pressure.

Referring to FIG. 1, a typical pilot valve installation is illustrated. In this figure, the pilot valve 10 has a control port 11, a vent port 12 and a pressure port 13. The control port 11 is connected to the cylinder chamber 14 above the piston 15 of the main valve element 16 which cooperates with a relief port 17 of the pressure vessel 18. The connection is made to the vessel 18 by a nipple 19 in the relief port 17 so that the pilot valve 10 is responsive to the vessel pressure. The vent port 12 is open to the atmosphere. In conventional operation, when the pressure in the vessel 18 is below the safe level, the pilot valve 10 effects fluid communication between the ports 11 and 13 to introduce pressure from the vessel 18 into the valve cylinder 14. When the pressure in the vessel 18 exceeds the safe value, i.e. blow-off pressure, the pilot valve 10 is actuated to interrupt the fluid communication between the ports 13 and 11 and to establish fluid communication between the ports 12 and 11, thereby venting the valve chamber 14 to atmosphere and permitting vessel pressure in the relief port 17 to displace the valve element 16 and open the relief port to afford escape of the excess pressure. Upon relief of the excess pressure in the vessel 18, the reduction in pressure at the pressure port 13 actuates the pilot valve 10 to reinstate the original fluid communication between the ports 13 and 11 and to interrupt the fluid communication between the ports 12 and 11.

In order to avoid damage from excessive pressure, it is desirable to insure positive and prompt operation of the pilot valve upon blow-off; and to avoid excessive loss of pressure fluid from the vessel 18, it is desirable to insure positive and prompt action of the pilot valve upon blow-down. To accomplish this end, an improved structural arrangement of the pilot valve elements is provided. To this end, pilot valve 10 comprises a housing 21 having a control chamber 22 therein which is open to the control port 11 as shown in FIG. 2. The housing includes upper and lower insert portions 19 and 20. The control chamber 22 is connected to the vent port 12 by a valve throat 23 extending upwardly from the chamber 22 and terminating at its upper end in a valve seat 24 which is normally closed by a disc valve element 25. The valve element 25 is housed in the upper portion 19 of the housing 21 and is guided by a stem 26 which is biased downwardly by a spring 27 having an adjustment at 28 for accurately regulating the bias applied to the valve disc 25. The portion 19 of the housing is vented to the vent port 12 at the upper side of the valve disc 25 by a passageway 31, and at the under side of the valve element 25 by a passage 32. As shown in FIG. 3, the passage 32 is positioned below the valve seat 24 to provide a pressure-building chamber 29 in which the valve disc 25 is slidably displaced. It is apparent that when the pressure in the valve throat 23 on the under side of the valve element 25 is sufficiently great to overcome the bias of the spring 27, as determined by the adjustment 28, the valve element 25 is elevated, as shown in FIG. 4. The flow of pressure fluid through the valve seat 24 distributes the pressure of the pressure fluid over the entire under surface of the valve element which operates like a piston in the chamber 29, thereby multiplying the force tending to elevate the valve, and causing an abrupt and prompt displacement of the valve element 25, as shown in FIG. 4. The placement of the passage 32 below the top of the seat 24 retards or restricts the dissipation of the pressure generated in the chamber 29 under the valve element 25 and thereby insures prompt and positive actuation of the valve element, once the pressure exceeds that necessary to open the valve. Thus the passage 32 serves as a restriction upon the discharge of pressure from the pressure-building chamber 29.

A somewhat similar connection is provided between the control chamber 22 and the pressure port 13. To this end, the valve includes a downwardly directed valve throat 33 terminating at its lower end in a valve seat 34 which cooperates with a spherical valve element 35 housed in the lower insert portion 20. The valve element 35 is normally displaced away from the seat 34 by its weight and rests against a pressure fluid inlet 36 at the bottom of the portion 20 which communicates directly with the pressure port 13 as shown in FIG. 2. The upper and lower valve elements 25 and 35 are loosely interconnected by a rod 37 having a sliding fit at its upper end in the valve element 25 and a sliding fit at its lower end in the throat 33. To afford a passage of fluid through the throat, the valve rod 37 is provided with a ported axial bore 38 which is ported at its upper end to the control chamber 22 and is ported adjacent its lower end, normally into a pressure-building enlargement or chamber 39 upwardly adjacent the seat 34. The bottom of the bore 38 bears against the spherical valve element 35 and is normally closed by the valve element. There is limited clearance in the lower insert portion 20 around the spherical element 35, so that when the pressure rises in the inlet 36, the pressure in the chamber 22 rises, as shown in FIG. 3. The force generated by the elevated pressure in the chamber 22 against the element 25 tends to displace the element upwardly to vent the chamber 22. The venting of the chamber 22 reduces the pressure above the lower element 35 until it seats on the seat 34. It should be noted that when the rod 37 raises, the lower ports of the bore 38 are substantially closed, restricting the flow through the throat 33, so as to assist in the reduction of the pressure above the valve element 35 tending to further elevate the valve. When the upper valve element is displaced from its seat, the pop action of the valve divorces the pressure of the spring from the road 37 so as to insure firm seating of the spherical element 35 against its seat 34. Thus, the control chamber 22 is connected to the vent port 12 through the upper throat 23 and the communication between the chamber and the pressure inlet 36 is interrupted. This condition is illustrated in FIG. 5.

It is noted that the internal diameter of the seat 34 is comparable to the internal diameter of the seat 24 so that the upward force on the spherical valve element 35 maintains the ganged valve elements 35 and 25 in their upper position against the bias of the spring 27 as long as the static pressure in the inlet 36 is above the blow-off and blow-down pressures. When the pressure in the vessel, and accordingly in the pressure inlet 36, falls below the blow-down value, the pressure of the spring 27 overcomes the upward force on the valve element 35 and initiates downward displacement of the element 35 through the rod 37. As shown in FIG. 6, immediately upon separation of the element 35 from its seat 34, the pressure fluid is free to enter the pressure-building chamber 39, and the result is a reduction of the net pressure force tending to displace the spherical valve element 35 upwardly, the reduction being dependent upon the difference between the internal diameter of the valve seat 34 and the internal diameter of the ported passage 38. The substantial reduction in the resultant force on the valve 35 effects an immediate and abrupt downward displacement of the valve element 35 by the spring 27 through the medium of the rod 37. Thus the valve pops back to the position shown in FIG. 3 with the valve element 35 resting in its lowermost position and the valve element 25 engaged on its seat 24.

As pointed out above, the blow-off and blow-down pressures are substantially equal and the present invention insures accurate regulation of the blow-off pressure, through the medium of the adjustment 28. If it is desired to adjust the blow-off and blow-down pressures independently of one another, this may be accomplished.

Preferably the seat 34 is slightly larger than the seat 24 so that the resultant force upon the valve element 35 is sufficiently greater than the spring force to maintain the valve element 25 elevated against the return force of the spring until the blow-down pressure is attained. The spring force for blow-down is greater than the spring force for blow-off by an amount equal to the displacement of the spring times its spring constant. The displacement in the present instance is small so as to minimize the difference in spring force for blow-off and for blow-down, and this displacement may be accurately adjusted by adjusting the lower seat, for example by the adjusting means 41 on the lower insert portion 20 at the bottom of the valve casing 21. This adjustment affords accurate and precise regulation of the blow-down and permits the blow-down pressure to be set very close to the blow-off pressure.

While the foregoing description has been made with reference to relief of the pressure in a vessel 18, it is apparent that the pilot valve described above has wider utility and may be used for actuating valves which relieve the pressure in high pressure lines, and in other installations.

While a particular embodiment of the present invention has been herein illustrated and described, it is not intended to limit the invention to such disclosure but changes and modifications may be made therein and thereto within the scope of the following claims.

I claim:

1. In a pilot valve having a control port, a vent port, and a pressure port, a venting valve element displaceable between open and closed limit positions intermediate said control port and said vent port, a pressure valve element displaceable between open and closed limit positions between said control port and said pressure port, and means ganging said valve elements for cooperative displacement whereby said control port is alternatively connected to said pressure port and said vent port, depending upon the pressure in said pressure port, said pilot valve including a valve throat extending from said control port and terminating at its remote end in a pressure valve seat cooperable with said pressure valve element, the pressure in said pressure port operable on said pressure valve element and tending to displace said element toward its closed limit position in engagement with said pressure seat, said ganged valve elements having a bias tending to displace said pressure valve element away from its seat, the pressure fluid in said pressure port operable to overcome said bias and displace said pressure valve element onto said pressure seat when its pressure exceeds the blow-off pressure, said pressure valve element operable to be displaced from its seat when the pressure of the fluid in said pressure port falls below the blow-down pressure; the improvement wherein said throat includes a pressure-building chamber adjacent said seat, and valving means preventing substantial flow of pressure fluid from said pressure-building chamber through said throat to said control upon initial opening of said pressure valve element by displacement of said pressure valve element from its seat, pressure fluid from said pressure port being accommodated in said pressure-building chamber to augment said bias and insure prompt and positive displacement of said pressure valve element away from said seat to its open limit position upon reduction of the pressure in said pressure port to blow down pressure, said valving means including passage means operable upon further displacement of said pressure valve element to afford free flow between said pressure-building chamber and said control port.

2. A valve according to claim 1 wherein the ganged valve elements include a rod element extending through said throat and engaging said pressure valve element, said rod having a ported axial bore comprising valving means intermediate said pressure-building chamber and the control port, said rod being in sliding engagement with said throat to limit flow therethrough, and said ported bore in said rod being closed when said pressure valve element is initially displaced from its seat, and operable to be opened after substantial displacement of said pressure valve element from its seat to afford said free flow through said throat.

3. Apparatus according to claim 2 including lateral ports spaced along said axial bore, the innermost of said ports being in constant communication with said control port and the outermost of said ports being closed by said throat both when said pressure valve element is seated and when said element is initially displaced, and being open to said pressure-building chamber after said substantial displacement of said pressure valve element from its seat.

4. Apparatus according to claim 3 wherein said valve includes a venting throat in longitudinal alignment with said pressure throat and terminating at its remote end in a venting seat cooperable with said venting valve element, said rod extending through said throats and being slidably engaged in said venting valve element, said pilot valve including a venting pressure chamber surrounding said venting seat and slidably receiving said venting valve element therein, said venting pressure chamber being connected to said vent port by a restricted flow passage, whereby upon initial opening of said venting valve element, pressure fluid flowing through its seat into said venting pressure chamber operates to slidably displace said venting valve element in said venting pressure chamber, insuring prompt and positive opening of said venting valve element.

5. Apparatus according to claim 2 wherein said pressure valve element comprises a spherical member, one end of said axial bore of said rod being open and cooperable with said spherical element to be closed thereby when in engagement therewith, said valve seat being of circular form of greater diameter than said rod so as to cooperate with said pressure valve element, said pressure-building chamber adjacent said seat being formed by a recessed portion of said valve throat immediately adjacent said seat.

6. Apparatus according to claim 5 wherein said spherical valve element is free for movement in response to either pressure in said pressure port or the bias of said rod.

7. Apparatus according to claim 2 wherein the bias of said ganged valve elements is provided by a spring, and the aforesaid pressure valve seat is adjustable to regulate the displacement of said valve spring and thus the blow-down pressure relative to the blow-off pressure.

8. A positive-action valve having a control port and a pressure port, the valve being responsive to the pressure in said pressure port, a valve throat open at one end to said control port and terminating at the other end in a valve seat, a valve element cooperable with said seat, means biasing said valve element away from said seat against the pressure of the fluid in said pressure port to open said valve when the pressure in said pressure port falls below a blow-down level, said means including a rod slidable in said throat and engaging said valve element, said rod including a length having a sliding fit in the throat restricting flow of fluid therethrough, passage means bypassing said length and affording free flow of fluid between said seat and said control port, means closing said passage means during initial displacement of said valve element from its seat and opening said passage means after displacement of said valve element from said seat a substantial distance, said seat being provided with a recess surrounding said rod in said throat cooperable with said valve element to constitute a pressure-building chamber in which pressure fluid may be received upon initial displacement of said valve element from said seat, the fluid in said chamber supplementing the bias of said rod to positively displace said valve element away from said seat.

9. A valve according to claim 8 wherein said valve element comprises said means to maintain said passage means closed when said valve is closed and during initial displacement of said valve from said seat, and to open said passage means after displacement of said valve element a substantial distance from its seat.

10. A valve according to claim 8 wherein said passage means comprises an axial bore in said rod, one end of said bore being open to said control port and the other end of said bore engaging said valve element to be closed thereby when said valve element is seated on said seat, said rod being displaceable with said valve element during initial displacement of said valve from said seat to maintain said bore closed.

11. A valve according to claim 10 including a port in said bore which is positioned to be closed by a sliding fit in said throat when said valve element is seated and to be open to said pressure-building chamber after substantial displacement of said valve element from its seat to thereby open said bore to the flow of pressure fluid therethrough.

* * * * *